J. B. KETCHUM.
AUTOMOBILE AXLE.
APPLICATION FILED MAR. 10, 1916.
1,274,559.
Patented Aug. 6, 1918.
2 SHEETS—SHEET 2.
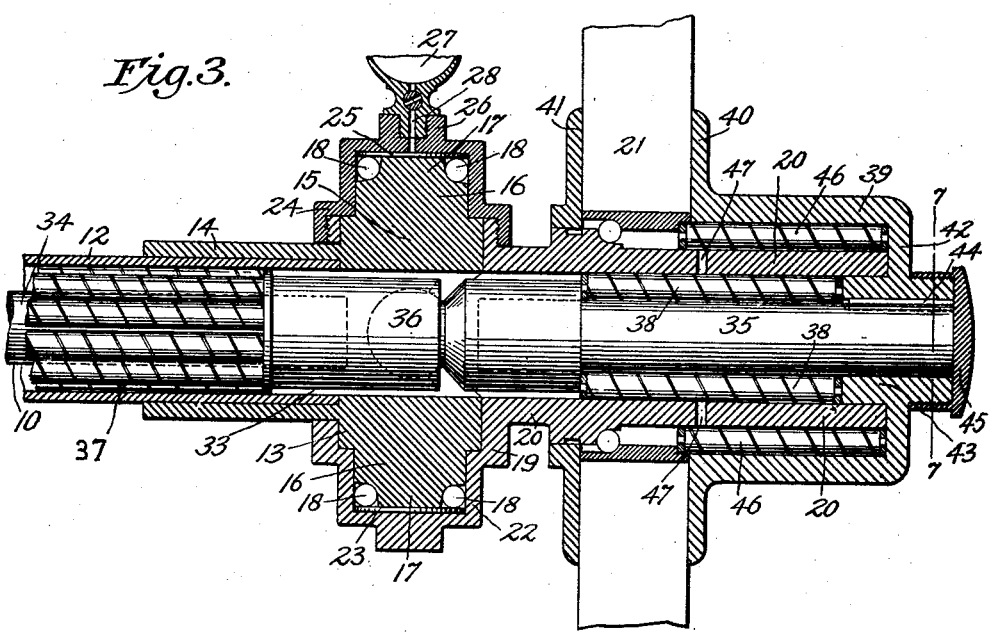
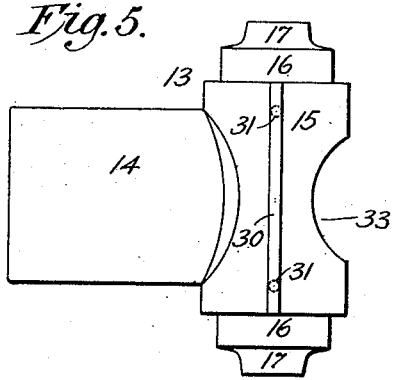
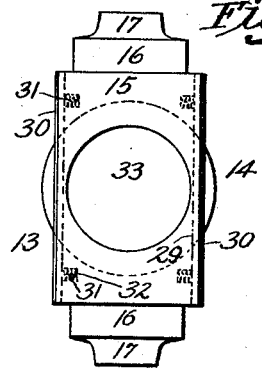
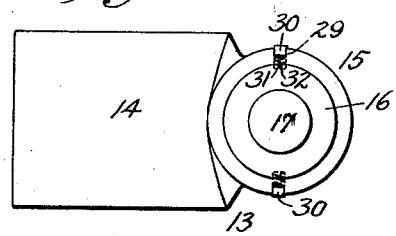
Inventor
JESSE B. KETCHUM
Attorneys.

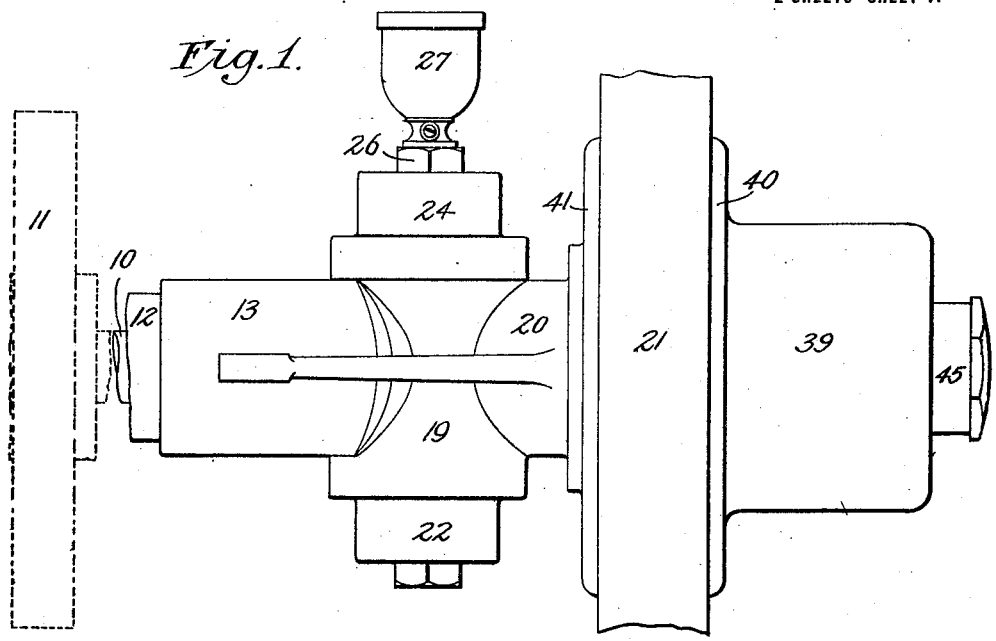
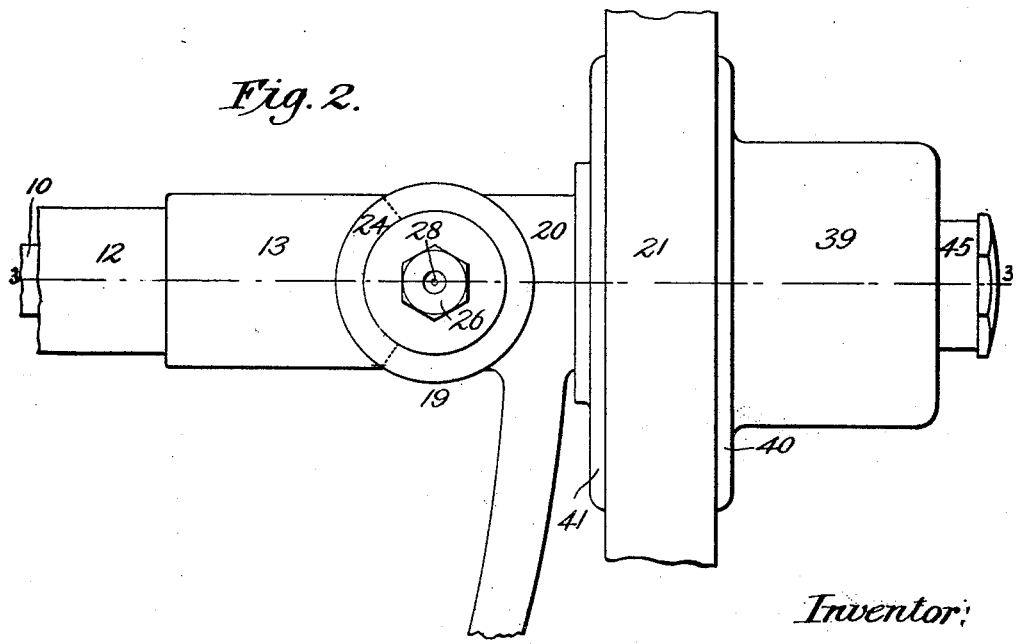

UNITED STATES PATENT OFFICE.

JESSE B. KETCHUM, OF HAMPSHIRE, ILLINOIS.

AUTOMOBILE-AXLE.

1,274,559.  Specification of Letters Patent.  Patented Aug. 6, 1918.

Application filed March 10, 1916. Serial No. 83,337.

*To all whom it may concern:*

Be it known that I, JESSE B. KETCHUM, a citizen of the United States, residing at Hampshire, in the county of Kane and State of Illinois, have invented new and useful Improvements in Automobile-Axles, of which the following is a specification.

This invention relates to road vehicles, and more particularly to the front axles of motor driven vehicles, of that type in which the ends of the axle to which the front wheels are fixed are swiveled so as to swing on vertical axes for the purpose of steering the vehicle.

The main object of the invention is to provide an improved front axle of the kind set forth and adapted to vehicles driven by motors through power developed by steam, gas or electricity, and transmit this motive power from the centrally located gear set, to the front wheels of the vehicles as well as to the rear wheels.

A further object of the invention is to mount the front axle proper on anti-friction bearings and rotate the same through suitable motor connections, the ends of the axle, on which the front wheels are keyed, being connected to the intermediate portion by ball and socket or other form of universal joints placed in the swiveling axes of the steering heads of the front wheels. By this means, a direct driving connection and easy steering of the front wheels are obtained with simple devices and no undue strain on any part.

With these and other objects in view, the invention consists of a novel construction, combination and arrangement of parts, as hereinafter more fully described and pointed out in the following claim, reference being had to the accompanying drawings, in which—

Figure 1 is a rear elevation of one end of the front axle of an automobile with the improvements applied thereto;

Fig. 2 is a plan view of the same;

Fig. 3 is a longitudinal section on the line 3—3 of Fig. 2;

Figs. 4, 5 and 6 are respectively side, front and plan views of the steering knuckle, and Fig. 7 is a sectional view on line 7—7 of Fig. 3.

Referring to the drawings by numerals, 10 indicates the front axle shaft proper, driven by the regular style of differential gearing common to motor vehicles mounted on the middle of the axle and indicated in dotted lines at 11. Surrounding the axle 10 is a tubular housing 12 connected in any suitable manner with the vehicle body through interposed springs, not shown, as such connections are well known in the art.

Immovable with each end of the housing 12 is a steering ball bearing knuckle 13. These knuckles, and the parts coöperating therewith being alike, the description here given of one is to be understood as referring to both. The knuckle 13 comprises a socket 14 that fits over the end of the housing 12 and is brazed, welded or otherwise rigidly fastened thereto. The socket 14 projects horizontally from a cylindrical head 15, the axis of which is vertical. Near each end the head is reduced in diameter as at 16, which reduced portions terminate in bearing cones 17 forming seats for anti-friction balls 18.

The head 15 is mounted in a casing 19 from which extends outwardly a tubular stem 20 that forms a bearing for one of the front wheels 21, the axis of said bearing being horizontal and in the same plane as the axis of the axle 10. The bottom of the casing 19 is in the form of a cup 22 of less diameter than the casing and flat within to support a washer 23 upon which the lower row of balls 18 rest. The upper end of the casing 19 is externally threaded for a cap 24 that screws thereon and contains a washer 25 bearing upon the upper row of balls 18. On the top of the cap 24 is a polygonal projection 26 for a wrench by means of which the cap is screwed on and off the casing 19. An oil cup 27 is screwed into this projection from which oil flows through a small hole 28 to the bearings within. Extending lengthwise of the head 15, on opposite sides thereof and between the reduced ends 16, are shallow grooves 29, in each of which is a strip 30 of metal packing, pressed outwardly against the inner surface of the casing 19 by two or more spiral springs 31 seated in cells 32 at the bottom of the grooves 29. These packing strips serve to hold the parts tight and thereby keep dirt out and oil in the bearing. Transversely of the head 19, continuous with the bore of the housing 12 and of the same diameter, is an opening 33 through which the axle 10 passes.

The axle 10 is made in three parts, an intermediate section 34 and two end sections 35, the driving gear 11 being fastened on the intermediate section and a front wheel keyed on each end section. Each end section is connected to an end of the intermediate section by a ball and socket or other type of universal joint 36 situated in the opening 33 in the head 15, the center of movement of said joint being in the vertical axial line of the head. By such arrangement of parts, the wheels 21 and their bearings 20 when swung about the heads 15 to steer the vehicle, carry the ends 35 of axle 10 with them, and as the centers of bearings 36 are coincident with the pivotal steering axes of the front wheels, these axle end sections 35 move angularly with perfect freedom and with no interference to the rotation of the axle 10. Roller bearings 37 are placed between the ends of the intermediate section 34 of the axle, adjacent the universal joints 36, and the housing 12, and similar bearings 38 lessen friction between the end sections 35 and the interior surface of wheel bearing 20.

The wheel 21 may be the usual type of automobile wheel which is here shown as provided with an outwardly projecting hub cap 39 having on its outer side a flange 40 through which bolts pass between the spokes to an annular plate 41 on the inner side of the wheel. The hub cap 39 is closed at its outer end at 42, which end bears against the end of the wheel bearing 20. Integral with the end 42 is a boss 43 that projects on both sides of said end, the inner portion of the boss extending into the bearing 20. A hole is formed longitudinally through the boss 43 for the end of the axle section 35 and a key 44 locks the hub cap 39, and hence the wheel 21, to the axle 10. A light metal cap 45 covers the outer end of the boss 43, the whole forming a neat and attractive wheel with no loose parts. If preferred, the end of the axle section 35 may be squared and the hole in the boss made of the same shape to insure rotation of the wheel. Roller bearings 46 are seated between the hub cap 39 and the outer surface of the wheel bearing 20.

Lubrication of the wheel bearings and the universal joint 36 is simultaneous with that of the head 15. From a single oil cup 27 oil flows first to the bearings of the head and around the head into the opening 33 to the universal joint 36 and thence laterally along the axle to roller bearings 37 and 38 and through perforations 47 in the wheel bearing 20 to roller bearing 46.

It is to be noted that the construction as described and shown is simple, light and of a neat appearance, easily made and assembled, and having all the advantages of the four wheel drive with less wear on the tires, the public roads, and a minimum consumption of engine power.

The front wheel bearings 20 are large and hollow, thus enabling the front axle to be removed endwise therethrough when necessary, furthermore, these bearings and the casings 19 of the steering heads are oil tight and so open to one another that a single oil cup on each side of the car is sufficient for perfect lubrication. The construction gives a full floating front axle with all the advantages of the rear axle and the additional advantage of swiveled ball bearing ends for turning the wheels for steering in the same manner as in present use.

I claim:—

The combination of a drive axle shaft having a flexibly connected end section, a housing inclosing the axle shaft and having a pivot knuckle composed of a cylindrical head having its axis intersecting the axis of the axle shaft and provided with bearing cones at its ends, a casing in which the head is mounted, said casing having a projecting tubular portion having a wheel bearing, the bottom of the casing being in the form of a cup to receive the corresponding end of the aforesaid head, a cap removably connected to the other end of the casing over the corresponding end of the head, and anti-friction balls between the bearing cones and the aforesaid bottom cup and the cap of the casing, the aforesaid wheel bearing being hollow to receive the end section of the axle shaft, and the internal diameter of said bearing being sufficient to permit the axle shaft and the connection between the same and the end section thereof to pass therethrough.

In testimony whereof I affix my signature.

JESSE B. KETCHUM.